UNITED STATES PATENT OFFICE.

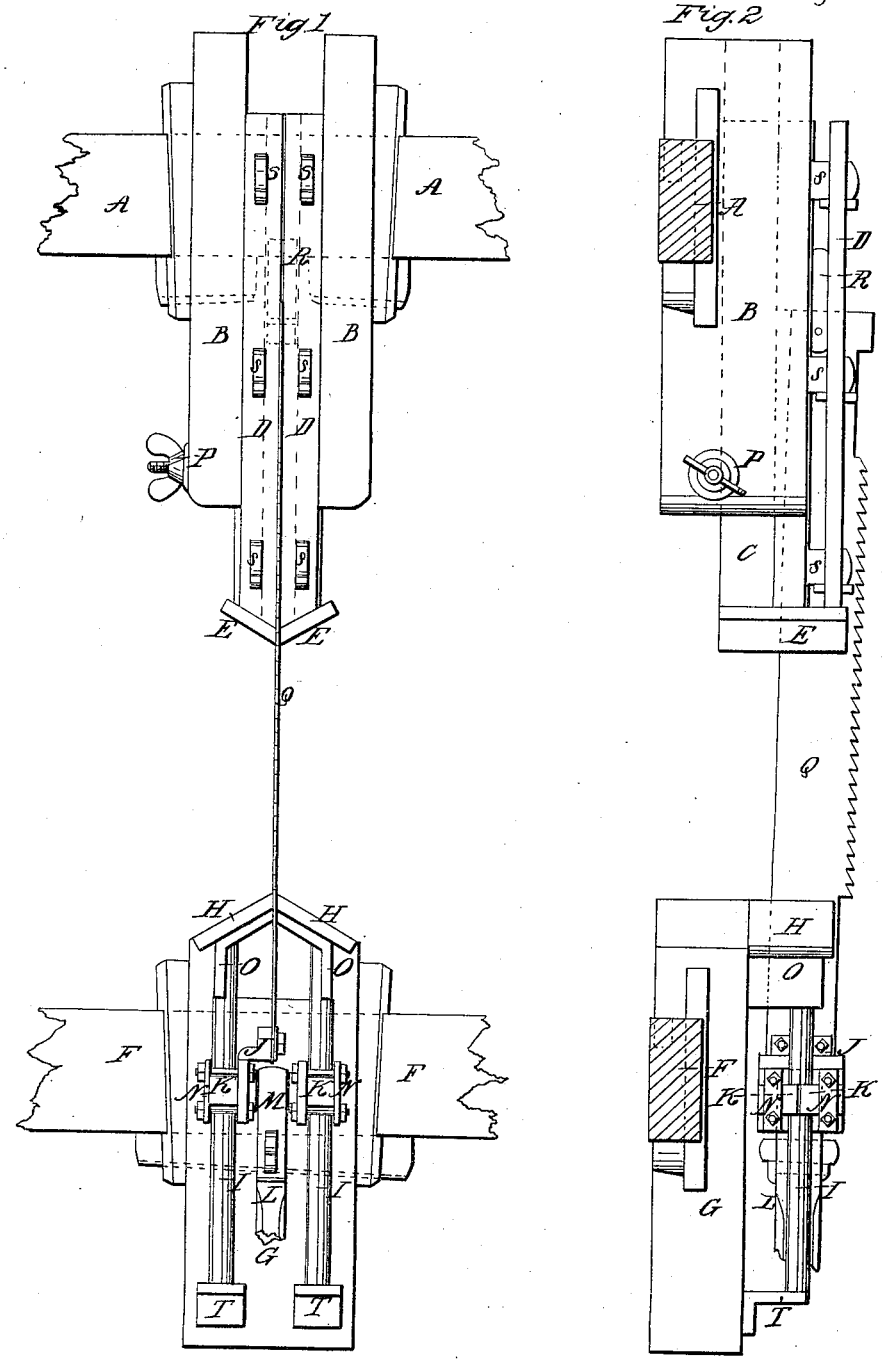

A. WINTER, OF PICKENS, SOUTH CAROLINA.

METHOD OF HANGING, GUIDING, AND ADJUSTING MULEY-SAWS.

Specification of Letters Patent No. 16,421, dated January 13, 1857.

*To all whom it may concern:*

Be it known that I, A. WINTER, of Pickens, in the county of Pickens and State of South Carolina, have invented certain new and useful Improvements in Sawmills; and I do hereby declare that the following is a full, clear, and exact description thereof, reference being had to the accompanying drawing, through letters of reference marked thereon, forming part of this specification, and in which—

Figure 1 represents a front elevation of the saw mill. Fig. 2 is a side elevation of the same.

The same letters of reference occurring in both figures indicate corresponding parts.

In the ordinary construction of saw mills having an adjustable head for guiding and steadying the saw above the timber to be cut this head is usually counterbalanced by weights, raised and lowered by roller and chains, or cords, or by rack and pinion, it being of too ponderous a construction to be moved by hand, and therefore requires considerable framing to guide and support it.

To simplify this part constitutes the first feature of my invention, and which consists in arranging a sliding head of compact construction between guides which serve to clamp it in any desired position.

It is also essential to the easy working and durability of the saw that its head should be guided perfectly true and steady, which requires suitable adjustment to compensate for the wear of the several parts.

To supply these in the simplest and best form constitutes the second feature of my invention.

The method of adjusting the lower end of the saw to regulate its advance motion in cutting to suit different sorts and sizes of lumber forms the third part of my invention and consists in so constructing the cross head to which the saw and pitman are attached as that the brasses which slide on the guide rods may be moved forward or backward and secured in any desired position on the cross head to give more or less pitch to the saw.

The fourth part of my invention consists in arranging the upper and lower guide posts independent of any framing, by attaching them to a beam and sill in the building in such manner that the usual fender posts and framing may be dispensed with, thereby saving considerable expense in first construction.

To enable others to make and use my invention I will describe its construction and operation by referring to the drawing in which—

(A) represents the beam, to which the clamps (B) are attached by hooked tenons (*a*) and keys (*b*). Between these clamps the sliding head (*c*) is fitted, having a vertical motion only, in which it is guided by a groove and fillet on either side. The screw (P) passing through the clamps at the back of the sliding head near their lower ends with a wing nut serves to clamp the sliding head and retain it in any desired position. On the face of this sliding head are starts or tenons (*s*) mortised into it, which pass through mortises in the face guards (D) which are secured onto them by keys (*d*). The inner edges of the guide head (*c*) are faced with metallic plates to prevent wear, and in front of the guide is a groove or saw kerf to receive the back of the saw (Q), to the upper end of which is attached a wooden or metallic block (R) which traverses vertically between the guide head and the face guards, while the saw traverses in the groove above named and between the face guards (D), thus guiding it each way as it reciprocates. To the lower end of the guide head and face guards are attached bottom guides (E) in such manner that they may be adjusted to the sides of the saw for the purpose of steadying and keeping it in range.

(F) is a sill to which the lower guide post (G) is attached by tenon (*e*) and keys (*i*), in a similar manner to that described of the clamps (B). On the front of this post are secured two guide rods (I) supported on brackets (O and T) forming guides for the lower end of the saw, which is attached to a bracket (J) on the crosshead. Said cross head is made with side flanges (*n*) between which and the plate (N) the brasses (K) are clamped by bolts passing through each on either side of them. The brasses (K) spanning the guide rods cause the cross head and with it the lower end of the saw to reciprocate in a vertical direction when put in motion through the pitman (L) by any suitable machinery. On the upper end of the guide rods (I) attached to the brackets (O) are adjustable guides (H) to steady and keep the saw in range beneath the log.

In hanging a saw on this plan I arrange the face of the sliding head (B) parallel with the guide rods (I) and sufficiently in advance of them to give the necessary pitch to the saw to perform the cut as it descends, and then further adjust its obliquity more or less to adapt the cut to lumber of different degrees of hardness by throwing the cross head forward or backward of the guide rods (I) by slipping the brasses (K) backward or forward on it and clamping them in the desired position.

Having thus described my invention what I claim as new and desire to secure by Letters Patent is—

1. The arrangement of the clamp guide posts (B) in combination with the sliding head (C) for securing it in any desired position substantially as set forth.

2. The method of constructing the sliding guide head (C) with the face guards keyed onto starts framed into the sliding head for the purpose of adjusting or renewing them in case of wear.

3. The arrangement of the boxes (K) in connection with the cross head (J) for the purpose of adjusting the saw to give it the desired advance motion during its downward stroke.

4. The arrangement of the guide posts (B) and upright (G) in combination with the beam (A) and sill (F) whereby the usual fender posts, &c., are dispensed with, all substantially as herein described.

In testimony whereof I hereunto subscribe my name this 22nd day of Octr., 1856.

A. WINTER.

Witnesses:
 ROBT. A. THOMPSON,
 R. D. MAXWELL,
 W. J. PARSONS.